(12) United States Patent
Nagata

(10) Patent No.: US 10,748,045 B2
(45) Date of Patent: Aug. 18, 2020

(54) DEVICE INCLUDING REPLACEABLE COMPONENT

(71) Applicant: Konica Minolta, Inc., Chiyoda-ku, Tokyo (JP)

(72) Inventor: Akihiro Nagata, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/430,568

(22) Filed: Jun. 4, 2019

(65) Prior Publication Data
US 2019/0377991 A1    Dec. 12, 2019

(30) Foreign Application Priority Data
Jun. 6, 2018   (JP) ................ 2018-108191

(51) Int. Cl.
| G06K 15/00 | (2006.01) |
| G06K 15/02 | (2006.01) |
| G06K 15/12 | (2006.01) |

(52) U.S. Cl.
CPC ....... G06K 15/4055 (2013.01); G06K 15/005 (2013.01); G06K 15/12 (2013.01); G06K 15/1886 (2013.01)

(58) Field of Classification Search
CPC .......... G06K 15/4055; G06K 15/1886; G06K 15/12; G06K 15/005; G03G 15/65; G06F 3/121; G06F 3/1235; G06F 3/1285
USPC ...................................................... 358/1.14
See application file for complete search history.

(56) References Cited

U.S. PATENT DOCUMENTS

2009/0097061 A1*  4/2009  Kaneko .............. H04N 1/00344
                                                    358/1.15
2015/0138583 A1*  5/2015  Miyahara ........... H04N 1/00814
                                                    358/1.13

FOREIGN PATENT DOCUMENTS

JP          2005115157 A      4/2005

\* cited by examiner

*Primary Examiner* — Tammy Paige Goddard
*Assistant Examiner* — Darryl V Dottin
(74) *Attorney, Agent, or Firm* — Buchanan Ingersoll & Rooney PC

(57) ABSTRACT

A device including a replaceable component, in which the component is not electrically connected to the device and includes a component-side storage, a component-side transmitter/receiver, a component-side hardware processor, and a component-side power generator, the device includes a main-body side storage, a counter which counts up the consumption degree of the component stored in the main-body storage, a main-body side transmitter/receiver, a main-body side hardware processor, a main-body side power generator, and a detector which detects attachment and detachment, the main-body side hardware processor causes the main-body side transmitter/receiver to transmit the specific identification information of the component and the consumption degree of the component when detachment is detected, and the component-side hardware processor rewrites the information in the component-side storage on the basis of the specific identification information of the component and the consumption degree of the component.

15 Claims, 4 Drawing Sheets

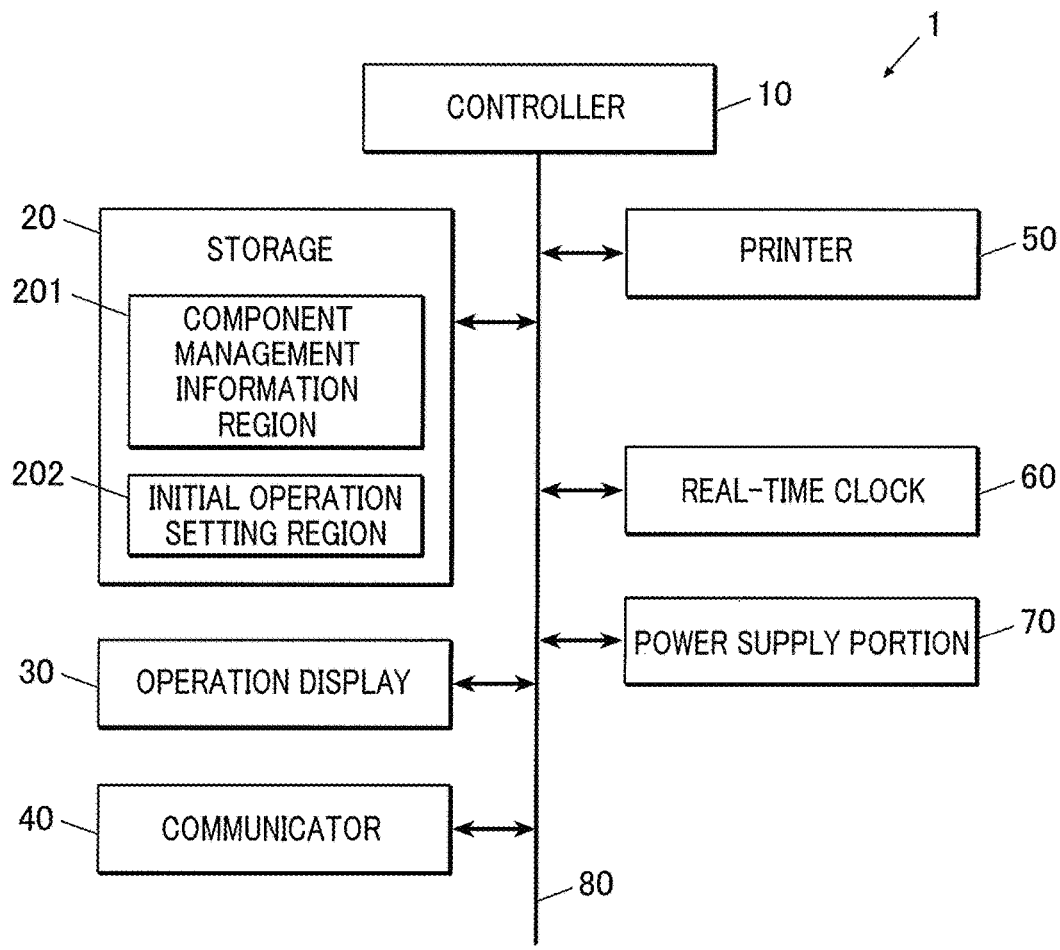

DEVICE INCLUDING REPLACEABLE COMPONENT

BACKGROUND

Technological Field

The present invention relates to a device including a replaceable component.

Description of the Related Art

In precision devices, a gear and the like are attached to a motor for driving a mechanical mechanism. They are consumable components and need to be regularly replaced in accordance with an operation situation. If operation is continued beyond a consumption limit, the component is broken and causes a failure and thus, a consumption degree counter for counting the consumption degree of the component is generally incorporated in the device and managed so that use is not continued beyond a limit value in order to remit a failure.

For example, Japanese Patent Laid-Open No. 2005-115157 describes an image forming device having a replaceable cartridge which includes a main-body storage storing specific information of the cartridge and a use history or the like of the cartridge and the main body on the main body side and a cartridge storage storing the specific information of the cartridge and the use history or the like of the cartridge and the main body on the cartridge side, and in image formation, the specific information of the main-body storage and the cartridge storage is compared with each other, and if they do not match, the information stored in the cartridge storage is read in the main-body storage. As a result, even if the cartridge is replaced with a used component, the consumption degree of the cartridge can be recognized correctly on the main body side. Moreover, it is also described that, when one image forming operation is finished and the information such as the use history in the main-body storage is updated, the information of the main-body storage is written in the cartridge storage. As a result, the consumption degree of the cartridge can be correctly stored in the cartridge storage.

Replacement of components is generally performed in a state where power is off since it is dangerous if the device starts operating during the replacement, but with the configuration in Japanese Patent Laid-Open No. 2005-115157, the information such as the use history (consumption degree counter) or the like in the storage on the main body side cannot be written in the storage on the component side when the power is off. Thus, in Japanese Patent Laid-Open No. 2005-115157, the information such as the use history (consumption degree counter) or the like on the main body side is written on the component side each time one image forming operation is finished.

However, the number of rewriting times is generally limited in many cases in the component-side storage provided on the component side, and if the rewriting is performed in each image forming operation, consumption of the component-side storage is expedited by useless rewriting.

SUMMARY

The present invention has an object to minimize consumption of the component-side storage by minimizing the number of rewriting times of the consumption degree in the component-side storage and to enable reflection of a an accurate consumption degree in the component-side storage and recognition of the accurate consumption degree by another device even if the component is attached to the another device again as a used component.

To achieve at least one of the aforementioned objects, according to an aspect of the present invention, a device including a replaceable component, in which
  the component is:
  a component not electrically connected to the device; and includes:
  a component-side storage which stores specific identification information of the component and a consumption degree of the component;
  a component-side transmitter/receiver which conducts transmission and reception of electromagnetic waves with the device;
  a component-side hardware processor which controls rewriting of the information in the component-side storage; and
  a component-side power generator which generates power for driving the component-side hardware processor, the component-side transmitter/receiver and the component-side storage on the basis of energy generated when the component is attached to/detached from a joint of the device;
  the device includes:
  a main-body side storage which stores specific identification information of the component and the consumption degree of the component;
  a counter which counts up the consumption degree of the component stored in the main-body side storage in accordance with use of the component;
  a main-body side transmitter/receiver which conducts transmission and reception of the electromagnetic waves with the component;
  a main-body side hardware processor which controls the transmission/reception of the information with the component;
  a main-body side power generator which generates power for driving the main-body side hardware processor, the main-body side transmitter/receiver and the main-body side storage on the basis of energy generated when the component is attached to/detached from the joint; and
  a detector which detects attachment and detachment of the component to/from the joint; and
  the main-body side hardware processor causes the main-body side transmitter/receiver to transmit the specific identification information of the component and the consumption degree of the component stored in the main-body side storage to the component when detachment of the component from the joint is detected; and
  the component-side hardware processor rewrites the information in the component-side storage on the basis of the specific identification information of the component and the information of the consumption degree of the component transmitted by the main-body side transmitter/receiver received by the component-side transmitter/receiver.

BRIEF DESCRIPTION OF THE DRAWINGS

The advantages and features provided by one embodiment of the invention will become more fully understood from the detailed description given hereinbelow and the appended drawings which are given by way of illustration only, and thus are not intended as a definition of the limits of the present invention. Herein, FIG. 1 is a diagram illustrating a functional configuration example of an image forming device;

FIG. 2 is a diagram illustrating a data storage example of a component management information region in a storage in FIG. 1;

DETAILED DESCRIPTION OF EMBODIMENTS

Figure 3:
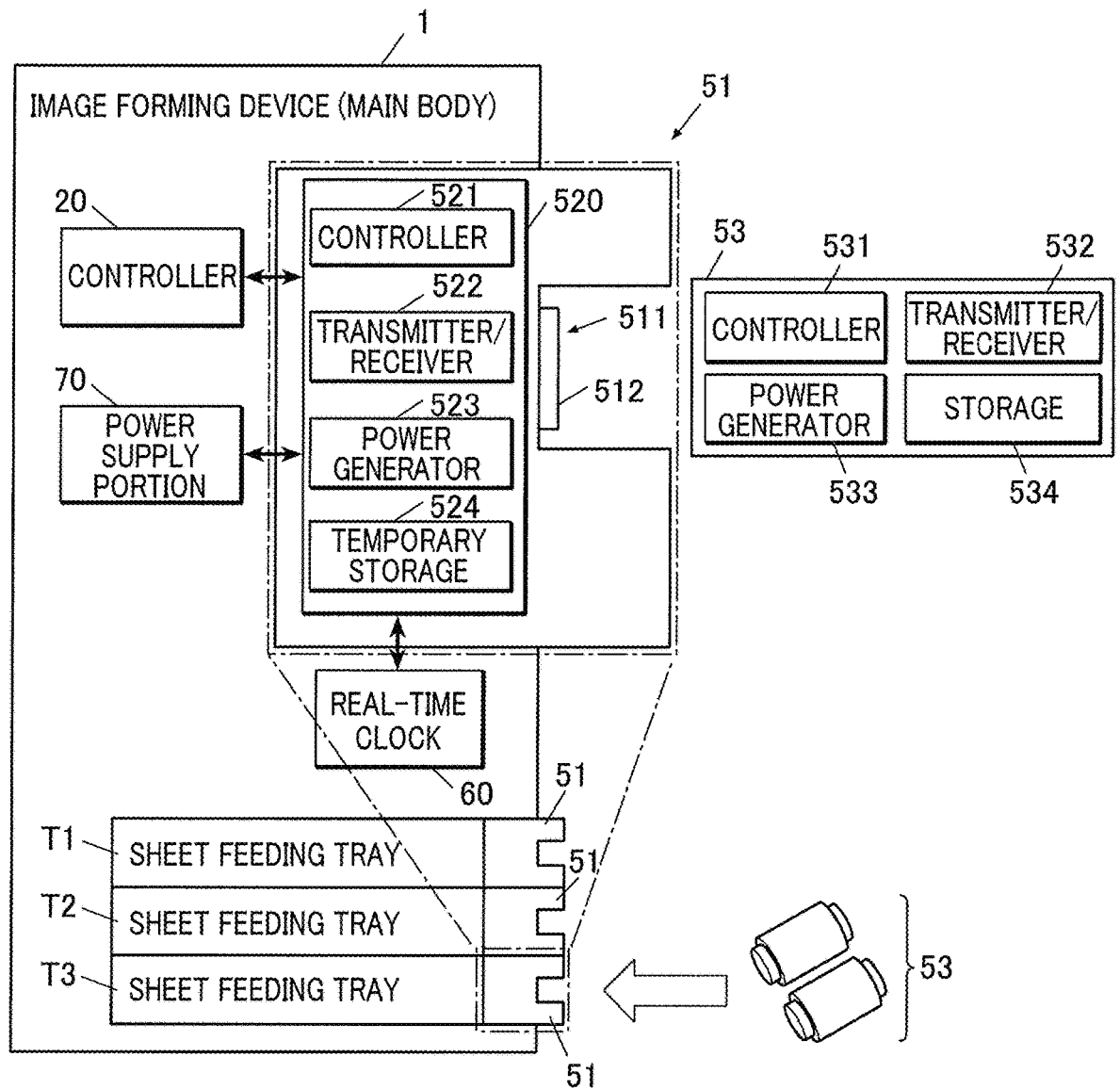
FIG. 3 is a diagram illustrating an example of configuration of a replaceable component attached to a printer and configuration of an attaching portion of the replaceable component in the printer.

Hereinafter, one embodiment of the present invention will be described with reference to the drawings. However, the scope of the invention is not limited to the illustrated examples.

Hereinafter, the embodiment will be described in detail on the basis of the drawings. However, the scope of the invention is not limited to the illustrated examples.

FIG. 1 is a block diagram illustrating functional configuration of an image forming device 1 according to this embodiment. As illustrated in FIG. 1, the image forming device 1 is configured to include a controller 10, a storage 20, an operation display 30, a communicator 40, a printer 50, a real-time clock 60, a power supply portion 70 and the like, and each one is connected by a bus 80.

The controller 10 is configured by a CPU (Central Processing Unit), a RAM (Random Access Memory) and the like. The CPU of the controller 10 reads out various programs such as a system program and a processing program stored in the storage 20 and extends them to the RAM and controls an operation of each one of the image forming device 1 in accordance with the extended program.

The storage 20 is configured by a non-volatile semiconductor memory (so-called flash memory), a HDD (Hard Disk Drive) and the like, for example. The storage 20 stores various programs and various types of data.

In this embodiment, a component management information region 201 and an initial operation setting region 202 are provided in the storage 20.

FIG. 2 is a diagram illustrating an example of the component management information region 201. Here, the printer 50 of the image forming device 1 includes a plurality of replaceable components 53 not electrically connected to the image forming device 1 main body (hereinafter referred to as replaceable components 53) (see FIG. 3). The component management information region 201 has regions such as "component name", "component ID", "time and date of attachment", "limit value", "consumption degree counter" and the like of each of the replaceable components 53 as illustrated in FIG. 2 and stores component management information made of these items. The "component ID" region stores specific identification information of the component (Identification information for identifying a type and an individual of the component. Called the component ID). The "time and date of attachment" region stores the time and date when the component was attached and the component ID was obtained. The "limit value" region stores a value of the consumption degree counter corresponding to a use limit of the component. The "consumption degree counter" region stores the counter value of the consumption degree of the component.

The initial operation setting region 202 has regions such as "component name", "initial operation flag", "initial operation item" and the like of each of the replaceable components 53. The "initial operation flag" is a region for storing a flag indicating whether the replaceable component 53 indicated by the "component name" is to be operated (ON) or not (OFF) in an initial operation when power is on. The "initial operation item" is a region for storing the operation item for operating the replaceable component 53 in the initial operation.

The operation display 30 is configured by an LCD (Liquid Crystal Display) and the like and displays statuses of various operation buttons, status display of the device, operation state of each function and the like on a display screen in accordance with an instruction of a display signal input from the controller 10. The display screen of the LCD is covered by a pressure-sensitive (resistance film pressure type) touch panel configured by disposing transparent electrodes in a lattice state, detects an XY coordinate of a power point pressed by a finger or a touch pen by a voltage value and outputs a detected position signal as an operation signal to the controller 10.

The communicator 40 is configured by a communication control card such as a LAN (Local Area Network) card, for example, and conducts transmission/reception of various types of data with external devices (such as a personal computer) connected to a communication network such as a LAN, a WAN (Wide Area Network) and the like.

The printer 50 includes a sheet feeder including sheet feeding trays T1 to T3 which feed sheets and the like, an exposure portion which exposes/scans a photoreceptor drum by generating a laser beam on the basis of input image data, an image forming unit which forms a toner image on the photoreceptor drum, a transfer portion which transfers the toner image on the sheet, a fixing portion which fixes the toner image formed on the sheet and forms (prints) an image by an electrographic method on the sheet fed from the sheet feeding trays T1 to T3 on the basis of the image data input from the controller 10.

Here, the printer 50 includes components consumed by operation. These consumable components are replaceable components 53 which can be replaced, and when the value of the consumption degree counter reaches the limit value, they are replaced with new components or used components. The replaceable component 53 may be a constituent part (unit) configured to be detachably attached to the printer 50 by combining a plurality of components. An example of the replaceable component 53 includes an image forming unit in which a sheet feeding roller provided in each of the sheet feeding trays T1 to T3, a developer, a charger, the photoreceptor drum, and a cleaning device are integrally constituted, for example.

Here, configuration of the replaceable component 53 attached to the printer 50 and the attaching portion 51 of the replaceable component 53 in the printer 50 will be described by referring to FIG. 3. In FIG. 3, a case where the replaceable component 53 is the sheet feeding roller of the sheet feeding tray T3 is used as an example, and the attaching portion 51 to which the sheet feeding roller is attached is illustrated in a partially enlarged manner.

The replaceable component 53 includes a controller (component-side hardware processor) 531, a transmitter/receiver (component-side transmitter/receiver 532, a power generator (component-side power generator) 533, a storage (component-side storage) 534 and the like as illustrated in FIG. 3.

The controller 531 is configured by a CPU and the like. The controller 531 is driven by power supplied by the power generator 533. When the controller 531 receives the component ID and the consumption degree transmitted from the image forming device 1 by the transmitter/receiver 532 when the replaceable component 53 is removed, the controller 531 rewrites the information in the storage 534 on the basis of the received information of the component ID and the consumption degree. Moreover, the controller 531 reads out the component ID and the consumption degree stored in the storage 534 and causes the transmitter/receiver 532 to transmit them to the image forming device 1 when the replaceable component 53 is attached.

The transmitter/receiver 532 is driven by the power supplied by the power generator 533 and conducts transmission and reception of the electromagnetic waves with the image forming device 1. When the transmitter/receiver 532 receives the component ID and the consumption degree transmitted from the image forming device 1, the transmitter/receiver 532 outputs the received component ID and the consumption degree to the controller 531. Moreover, the transmitter/receiver 532 generates the electromagnetic waves indicating the component ID and the consumption degree stored in the storage 534 and transmits them to the image forming device 1 in accordance with the control from the controller 531.

The power generator 533 is configured by a vibration power-generation element or the like, generates power by the vibration generated when the replaceable component 53 is attached to/detached from a joint 511 of the image forming device 1 and supplies it to the controller 531, the transmitter/receiver 532, and the storage 534 for driving.

Figure 4:
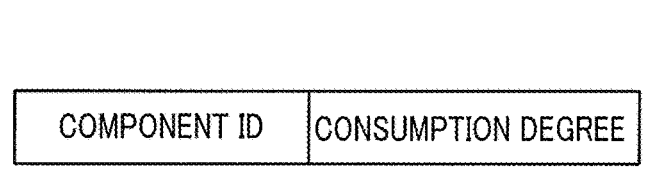
FIG. 4 is a diagram illustrating a data storage example of the storage on a component side.

The storage 534 is configured by a non-volatile semiconductor memory and the like and stores the "component ID" and the "consumption degree" of the replaceable component 53 as illustrated in FIG. 4.

On the attaching portion 51 of each of the replaceable components 53 provided on the printer 50, as illustrated in the partially enlarged view of FIG. 3, a substrate 520 is provided on which the joint 511 to be joined to the replaceable component 53, a controller (main-body side hardware processor) 521, a transmitter/receiver (main-body side transmitter/receiver) 522, a power generator (main-body side power generator) 523, and a temporary storage (main-body side storage) 524 are mounted. Moreover, a switch (detector) 512 is provided on the joint 511.

The controller 521 is configured by a CPU and the like and is driven by power supplied from the power generator 523 or the power supply portion 70. When detachment of the replaceable component 53 from the joint 511 is detected by the switch 512, the controller 521 reads out the component ID and the consumption degree counter stored in the temporary storage 524 and causes the transmitter/receiver 522 to transmit them to the replaceable component 53. Moreover, when attachment of the replaceable component 53 to the joint 511 is detected by the switch 512, the controller 521 receives the component ID and the consumption degree transmitted from the replaceable component 53 by the transmitter/receiver 522 and rewrites the component ID and the value of the consumption degree counter stored in the temporary storage 524 with the received component ID and the consumption degree. Moreover, a current time and date is obtained from the real-time clock 60 and the time and date of attachment stored in the temporary storage 524 is rewritten.

The transmitter/receiver 522 is driven by the power supplied from the power generator 523 or the power supply portion 70 and conducts transmission/reception of the electromagnetic waves with the replaceable component 53. When the transmitter/receiver 522 receives the component ID and the consumption degree transmitted from the replaceable component 53, it outputs the received component ID and the consumption degree to the controller 521. Moreover, the transmitter/receiver 522 generates the electromagnetic waves indicating the component ID and the consumption degree stored in the temporary storage 524 and transmits them to the replaceable component 53 in accordance with control from the controller 521.

For example, the power generator 523 is configured by a vibration power-generation element or the like, generates power by the vibration generated when the replaceable component 53 is attached to/detached from the joint 511, and supplies it to the controller 521, the transmitter/receiver 522, and the temporary storage 524 for driving.

Figures 5, 6:
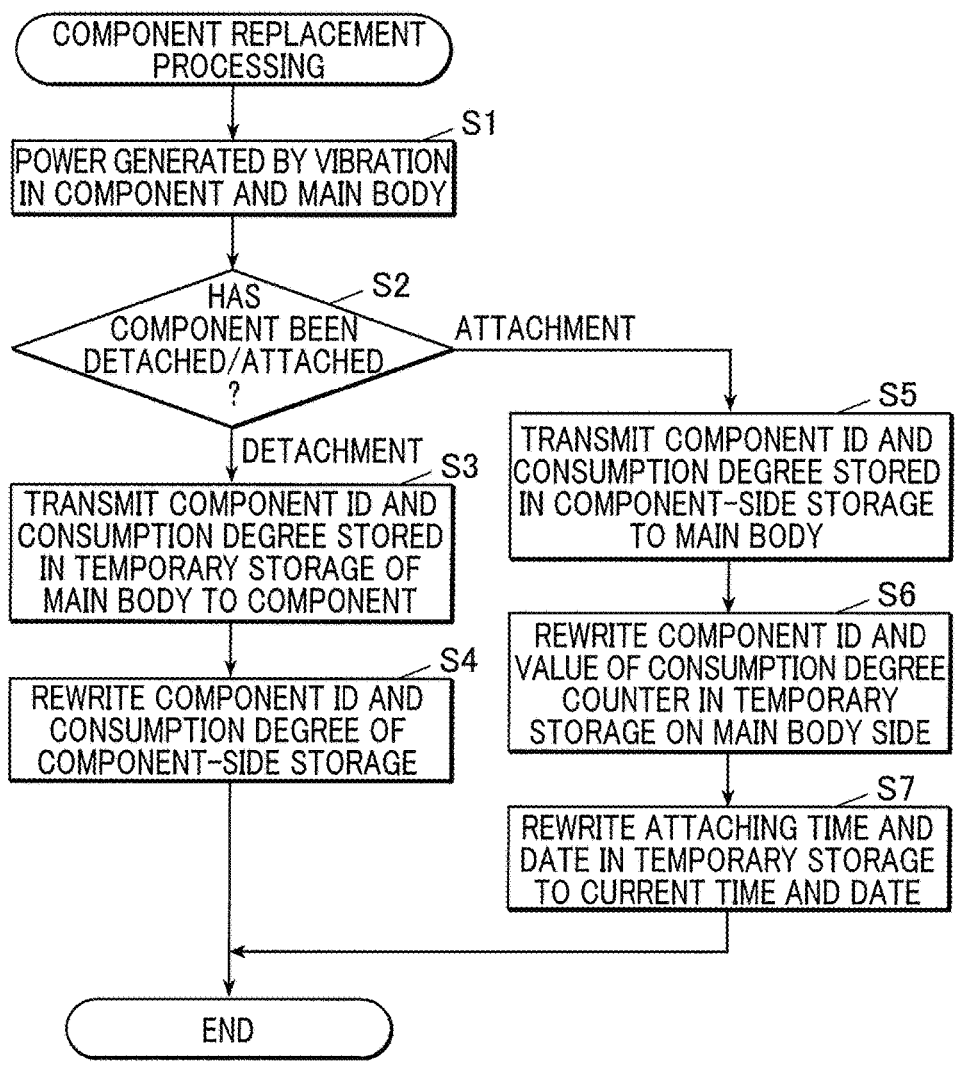
FIG. 5 is a diagram illustrating the data storage example of a temporary storage on a main body side.
FIG. 6 is a flowchart illustrating a flow of component replacement processing.

The temporary storage 524 is driven by the power supplied from the power generator 523 or the power supply portion 70. The temporary storage 524 is configured by a non-volatile semiconductor memory or the like and stores the "component name", the "component ID", the "consumption degree counter", and the "time and date of attachment" of the replaceable component 53 attached to the attaching portion 51 on which the temporary storage 524 is mounted as illustrated in FIG. 5.

As described above, each of the substrate 520 is configured to be capable of operation by the power generated by the power generator 523 by vibration generated in attachment/detachment of the replaceable component 53 even if the power of the image forming device 1 is OFF.

The switch 512 is a switch provided on the joint 511 and detecting attachment/detachment of the replaceable component 53 to/from the joint 511. The switch 512 is switched to ON when the replaceable component 53 is attached to the joint 511 of the image forming device 1 and is switched to OFF when it is removed from the joint 511.

Each of the replaceable components 53 corresponds to the controller 521, the transmitter/receiver 522, the power generator 523, the temporary storage 524, and the switch 512 in a one-to-one manner.

The real-time clock 60 counts current time and date information.

The power supply portion 70 is connected to a commercial AC power supply, not shown, and when a power switch (not shown) provided in the image forming device 1 is switched to ON, an AC (alternate current) power input from the commercial AC power supply is converted to a DC (direct current) power, and a required voltage is supplied to each one (including each one on the substrate 520).

Subsequently, an operation of the image forming device 1 will be described.

When the replaceable component 53 is to be replaced, first, a service staff operates the operation display 30 so as to select the replaceable component 53 to be replaced from a list of the replaceable components 53 and to instruct display of the previous time and date of attachment. The controller 10 obtains the time and date of attachment of the selected replaceable component 53 from the component management information region 201 of the storage 20 and causes the operation display 30 to display it. The service staff can check whether a third party unexpectedly attached/ detached the replaceable component 53 or not by checking the previous time and date of attachment of the displayed replaceable component 53.

When the check of the previous time and date of the attachment is finished, the service staff turns off power of the image forming device 1. As a result, the component can be replaced safely.

When attachment/detachment of the replaceable component 53 is performed in the attaching portion 51 (joint 511), vibration is generated. FIG. 6 is a flowchart illustrating a flow of component replacement processing executed in the image forming device 1 when the vibration is generated. Hereinafter, the flow of the component replacement processing will be described by referring to FIG. 6.

First, the power generator 523 generates power by vibration and supplies the power to the controller 521, the transmitter/receiver 522 and the temporary storage 524. Similarly, the power generator 533 generates power by vibration and supplies the power to the controller 531, the transmitter/receiver 532, and the storage 534 (Step S1).

Subsequently, the controller 521 determines whether the replaceable component 53 has been detached from the joint 511 or the replaceable component 53 has been attached to the joint 511 on the basis of ON/OFF of the switch 512 (Step S2).

If it is determined that the replaceable component 53 has been detached from the joint 511 (Step S2: detachment), the controller 521 obtains the component ID and the value of the consumption degree counter (consumption degree) stored in the temporary storage 524 and causes the transmitter/receiver 522 to transmit the electromagnetic waves indicating the obtained component ID and the consumption degree to the replaceable component 53 (Step S3).

When the electromagnetic waves indicating the component ID and the consumption degree from the transmitter/receiver 522 of the image forming device 1 main body is received by the transmitter/receiver 532 in the replaceable component 53, the controller 531 determines whether the component ID in the storage 534 matches the received component ID or not and if it determines that they match each other, it rewrites the consumption degree in the storage 534 with the received value (Step S4) and finishes the component replacement processing.

On the other hand, if it is determined that the replaceable component 53 has been attached to the joint 511 (Step S2: attachment), the controller 521 causes the transmitter/receiver 522 to transmit notification information that the replaceable component 53 has been attached (or a transmission instruction of the component ID and the consumption degree) to the replaceable component 53. When the controller 531 of the replaceable component 53 receives the notification information that the replaceable component 53 has been attached (or the transmission instruction of the component ID and the consumption degree) from the image forming device 1 main body by the transmitter/receiver 532, it reads out the component ID and the consumption degree from the storage 534 and causes the transmitter/receiver 532 to transmit the component ID and the consumption degree (Step S5).

It may be so configured that a switch for switching between ON/OFF by attachment/detachment of the replaceable component 53 to/from the joint 511 is provided at a spot joined to the joint 511 of the replaceable component 53, and the controller 531 reads out the component ID and the consumption degree from the storage 534 and causes the transmitter/receiver 532 to transmit the component ID and the consumption degree when attachment of the replaceable component 53 to the joint 511 is detected by the switch 512.

Here, in electromagnetic wave transmission using power by environmental power generation, shortage of electromagnetic wave intensity due to power shortage can occur depending on a way of attaching or detaching of the replaceable component 53. In order to prevent such a situation, if power of the replaceable component 53 is smaller than the power generated on the main body side of the image forming device 1, the power on the replaceable component 53 side is preferably supplemented by using the power generated on the main body side. For example, a power amount required for rewriting the component ID and the value of the consumption degree counter in the temporary storage 524 with the component ID and the consumption degree received from the replaceable component 53 is measured and stored in advance in the temporary storage 524 on the main body side, and the controller 521 calculates an excess power amount from a difference between the power amount generated in the power generator 523 and the power amount required for rewriting and provides the excess power by transmitting the electromagnetic waves corresponding to the excess power amount to the replaceable component 53 by the transmitter/receiver 522 before the replaceable component 53 transmits the component ID and the value of the consumption degree counter. The power generator 533 of the replaceable component 53 is configured to include a power generation element which generates power by the received electromagnetic waves, and the transmitter/receiver 532 of the replaceable component 53 transmits the component ID and the consumption degree to the main body side by using the power generated by the power generator 533 by the electromagnetic waves of the excess power provided by the transmitter/receiver 522. As a result, shortage of electromagnetic wave intensity can be prevented by increasing the electromagnetic wave intensity when the component ID and the consumption degree are transmitted from the replaceable component 53, and loss of data and the like can be prevented.

Moreover, in the electromagnetic wave transmission by power generated by environmental power generation, data loss can occur due to shortage of the electromagnetic wave intensity. Thus, when the controller 521 determines whether data loss has occurred in the component ID and the consumption degree received from the replaceable component 53 by the transmitter/receiver 522 and it is determined that data loss has occurred, excess power may be provided by transmitting the electromagnetic waves corresponding to the aforementioned excess power amount to the replaceable component 53 by the transmitter/receiver 522. The power generator 533 of the replaceable component 53 is configured to include the power generation element which generates power by the received electromagnetic waves, and the transmitter/receiver 532 of the replaceable component 53 re-transmits the component ID and the consumption degree to the main body side by using the power generated by the power generator 533 by the electromagnetic waves of the excess power provided by the transmitter/receiver 522. Whether the data loss has occurred or not can be determined by counting the number of digits of the received data or the like, for example. As a result, shortage of the electromagnetic wave intensity in re-transmission can be prevented.

In the image forming device 1 main body, when the component ID and the consumption degree are received by the transmitter/receiver 522, the controller 521 rewrites the component ID and the value of the consumption degree counter of the replaceable component 53 stored in the temporary storage 524 with the information of the component ID and the consumption degree received from the replaceable component 53 (Step S6).

Moreover, the controller 521 obtains the current time and date from the real-time clock 60, rewrites the time and date of attachment stored in the temporary storage 524 with the current time and date (Step S7) and finishes the component replacement processing.

As described above, in the image forming device 1, the value of the consumption degree counter of the replaceable component 53 is held in the temporary storage 524, and the value of the consumption degree in the storage 534 on the component side is rewritten with the value of the consumption degree counter stored in the temporary storage 524 by using power generated by using the vibration generated at timing when the replaceable component 53 is detached. Therefore, since the number of rewriting times of the storage 534 is only one at the timing when the replaceable component 53 is detached and thus, consumption of the storage 534 can be minimized. Moreover, since a value of the accurate consumption degree can be reflected in the storage 534, even if the detached replaceable component 53 is attached again to another image forming device as a used component, the accurate consumption degree can be recognized by the another image forming device.

Moreover, in the image forming device 1, the component ID and the value of the consumption degree counter in the temporary storage 524 on the main body side is rewritten with the component ID and the value of the consumption degree stored in the storage 534 of the replaceable component 53 by using power generated by using the vibration generated at timing when the replaceable component 53 is attached to the image forming device 1. The component ID and the value of the consumption degree counter stored in this temporary storage 524 are reflected in the component management information region 201 in the storage 20 by start processing (see FIG. 7) executed when power is turned on. Therefore, even if the attached replaceable component 53 is a used component, the value of the consumption degree counter in the component management information region 201 can be set to a value according to the consumption degree of the attached replaceable component 53.

Figure 7:
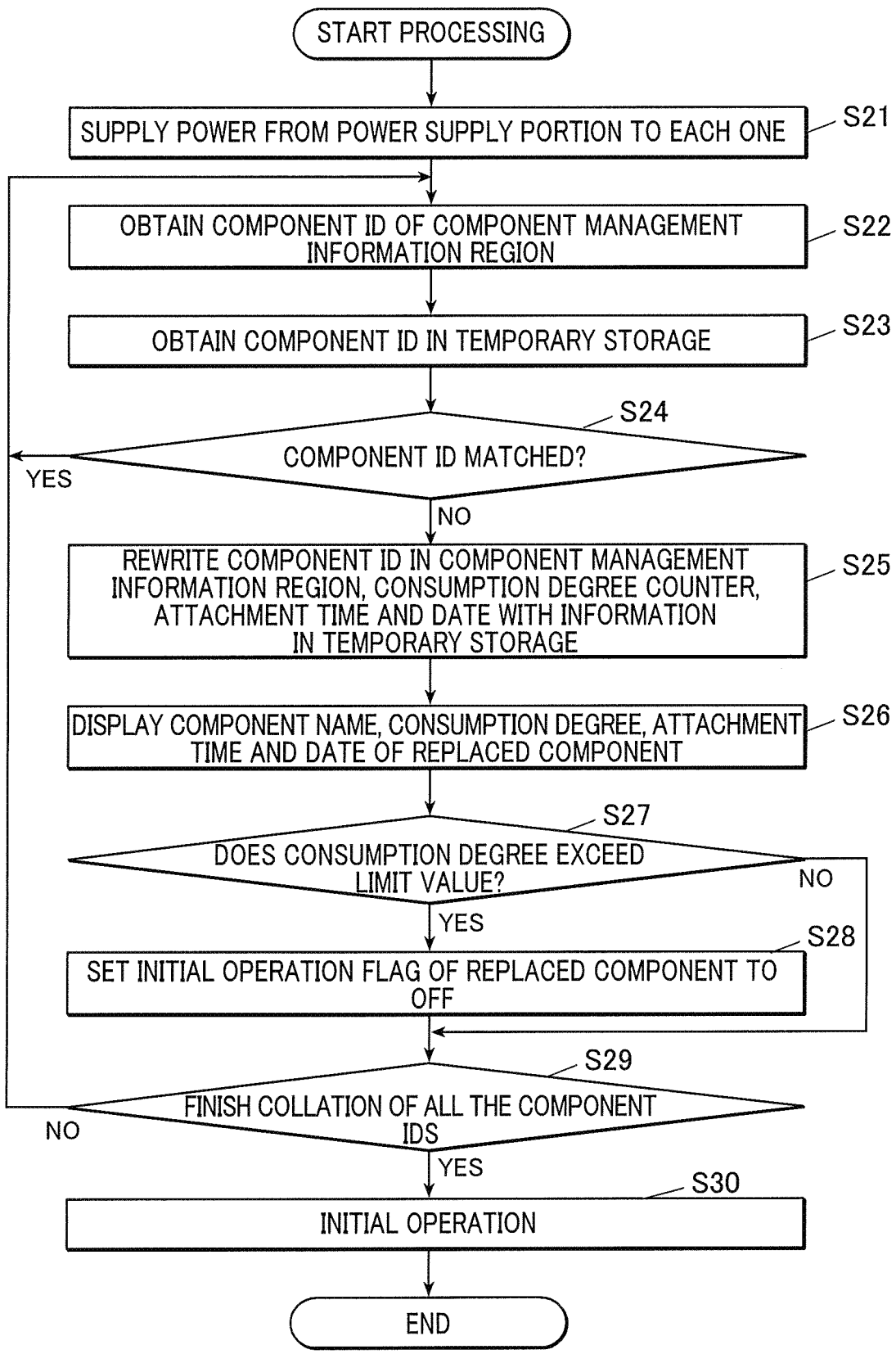
FIG. 7 is a flowchart illustrating a flow of start processing.

Subsequently, the operation of the image forming device 1 when the image forming device 1 is powered on (ON) will be described. FIG. 7 is a flowchart illustrating a flow of the start processing in the image forming device 1. Hereinafter, the flow of the start processing will be described by referring to FIG. 7.

First, power is supplied by the power supply portion 70 to each one in the image forming device 1 and it is started (Step S21).

Subsequently, the controller 10 obtains the component ID of the component management information stored in the component management information region 201 in the storage 20 (Step S22), obtains the component ID in the temporary storage 524 (temporary storage 524 which stores the same component name) corresponding to the obtained component management information (Step S23) and determines whether the component ID of the component management information matches the component ID in the temporary storage 524 or not (Step S24).

When it is determined that the component ID of the component management information matches the component ID in the temporary storage 524 (Step S24: YES), the controller 10 returns to Step S22.

If it is determined that the component ID of the component management information does not match the component ID in the temporary storage 524 (Step S24: NO), the controller 10 determines that the replaceable component 53 corresponding to the component management information has been replaced and rewrites the component ID of the component management information, a value of the consumption degree counter, and the time and date of attachment with the information in the temporary storage 524 (Step S25).

Subsequently, the fact that the component was replaced, the component name (component name in the rewritten component management information), the value of the consumption degree counter, the time and date of attachment of the replaced replaceable component 53 are displayed on the operation display 30 by the controller 10 (Step S26).

Here, since a remaining life differs depending on whether the attached replaceable component 53 is a used component or a new component and thus, it is preferable to actively notify a user which of a new component and a used component was used or what consumption degree was of the attached used component when the component is replaced. Thus, the controller 10 can allow the user to recognize whether the attached replaceable component 53 is a new component or a used component and if it is a used component, what the consumption degree is by displaying the consumption degree of the replaceable component 53 attached in the component replacement on the operation display 30 by pop-up or the like. In order that the user can recognize the consumption degree of the attached replaceable component 53 at a glance, a size and a color of a pop-up screen to be displayed, an icon to be displayed and the like may be changed in accordance with the consumption degree.

Subsequently, the controller 10 compares the value of the consumption degree counter of the rewritten component management information with the value of the limit value and determines whether the consumption degree of the attached replaceable component 53 exceeds the limit value or not (Step S27).

If it is determined that the consumption degree of the attached replaceable component 53 does not exceed the limit value (Step S27: NO), the controller 10 moves to Step S29.

If it is determined that the consumption degree of the attached replaceable component 53 exceeds the limit value (Step S27: YES), the controller 10 sets an initial operation flag of the replaced replaceable component 53 in the initial operation setting region 202 to OFF (Step S28) and moves to Step S29.

At Step S29, the controller 10 determines whether collation between all the component IDs in the component management information and the corresponding component ID in the temporary storage 524 has been finished or not (Step S29).

If it is determined that the collation between all the component IDs in the component management information and the corresponding component ID in the temporary storage 524 has not been finished (Step S29: NO), the controller 10 returns to Step S22, obtains the component management information for which the collation has not been completed and repeatedly executes Step S22 to Step S28.

If it is determined that the collation between all the component IDs in the component management information and the corresponding component ID in the temporary storage 524 has been finished (Step S29: YES), the controller 10 refers to the initial operation setting region 202, executes the initial operation excluding an item of operating the replaceable component 53 with the initial operation flag being OFF (Step S30), and finishes the start processing.

The initial operation is an operation for control such that each one of the printer 50 is operated normally at start of the image forming device 1. Here, when the replaceable component 53 with the consumption degree exceeding the limit value is attached, if the replaceable component 53 is operated in the initial operation at power-on, the attached replaceable component 53 or the main body of the image forming device 1 can be broken at the instance in some cases. Thus, the controller 10 refers to the initial operation setting region 202 and if there is the replaceable component 53 with the initial operation flag being OFF, that is, if the replaceable component 53 with the consumption degree already beyond the limit value is attached, such control is executed that the initial operation of operating the replaceable component 53 is not performed. As a result, breakage of the replaceable component 53 or the main body can be prevented.

Each time the printer 50 is operated, the controller 10 counts up the values of the "consumption degree counter" in the component management information region 201 of each replaceable component 53 operated by the operation and in the temporary storage 524 by a predetermined number (different depending on the component) as a counter. For example, the values of the "consumption degree counter" in the component management information region 201 and in the temporary storage 524 regarding the sheet feeding roller 1 are counted up by the predetermined number according to a rotation number of the sheet feeding roller 1 per fed sheet each time one sheet is fed from the tray T1 of the sheet feeder in the printer 50.

Moreover, if there is a component with the value of the "consumption degree counter" reaching the "limit value", the controller 10 notifies the identification information, an installed place, the component name with the consumption degree reaching the limit value and the like of the image forming device 1 to the service staff through the communicator 40. Alternatively, by displaying the component name and the fact that the consumption degree has exceeded the limit value on the operation display 30, a notification for promoting contact with the service staff may be made.

Here, component replacement is performed generally after the power is turned OFF in view of safety as described above, but the replaceable component 53 is attached/detached when the power is on in some cases. In this case, too, attachment/detachment of the replaceable component 53 can be detected by vibration generated by attachment/detachment of the replaceable component 53 similarly to the case where the power is OFF. At this time, the transmitters/receivers 522 and 532 may transmit/receive the information such as the component ID and the consumption degree between the main body side and the replaceable component 53 by power generated by the power generator 523 and the power generator 533 or the information such as the component ID, the consumption degree and the like may be transmitted/received between the main body side and the replaceable component 53 by using the power supplied by the power supply portion 70.

(Variation)

In the aforementioned embodiment, the case where the power generator 523 on the main body side and the power generator 533 on the replaceable component 53 side are both constituted by vibration power-generation elements which generate power by vibration is described as an example, but the either one of the power generator 523 and the power generator 533 may be constituted by an environmental power generation element which converts the received electromagnetic waves to power.

If the power generator 523 is the vibration power-generation element and the power generator 533 is the power generation element which converts the received electromagnetic waves to power, for example, when the vibration occurs, the power generator 523 generates power by vibration and supplies the power to the controller 521, the transmitter/receiver 522, and the temporary storage 524. Moreover, the controller 521 causes the transmitter/receiver 522 to transmit the electromagnetic waves. In the replaceable component 53, when the electromagnetic waves are received by an antenna of the transmitter/receiver 532, the power generator 533 converts the received electromagnetic waves to power and supplies the power to the controller 531, the transmitter/receiver 532, and the storage 534.

Moreover, if the power generator 533 is the vibration power-generation element and the power generator 523 is the power generation element which converts the electromagnetic waves to power, for example, when the vibration occurs, the power generator 533 generates power by the vibration and supplies the power to the controller 531, the transmitter/receiver 532, and the temporary storage 534. Moreover, the controller 531 causes the transmitter/receiver 532 to transmit the electromagnetic waves. When the electromagnetic waves are received by an antenna of the transmitter/receiver 522 on the main body side, the power generator 523 converts the received electromagnetic waves to power and supplies the power to the controller 521, the transmitter/receiver 522, and the temporary storage 524.

Processing operations of the aforementioned component replacement processing and an operation when power is ON after the power is supplied to the controller 521, the transmitter/receiver 522, and the temporary storage 524 on the main body side and the controller 531, the transmitter/receiver 532, and the storage 534 of the replaceable component 53 are similar to those described in the aforementioned embodiment.

As described above, according to the image forming device 1, the power generator 523 which generates power for driving the controller 521, the transmitter/receiver 522, and the temporary storage 524 on the basis of energy (vibration, received electromagnetic waves) generated by attachment/detachment of the replaceable component 53 is provided, and the controller 521 causes the transmitter/receiver 522 to transmit the component ID of the replaceable component 53 and the consumption degree of the replaceable component 53 stored in the temporary storage 524 when detachment of the replaceable component 53 from the joint 511 is detected by the switch 512. The replaceable component 53 has the power generator 533 which generates power for driving the controller 531, the transmitter/receiver 532, and the storage 534 on the basis of the energy (vibration, received electromagnetic waves) generated by attachment/detachment of the replaceable component 53 and rewrites the information in the storage 534 on the basis of the information of the component ID and the consumption degree of the component transmitted from the image forming device 1 received by the transmitter/receiver 532.

Therefore, since the number of rewriting times of the consumption degree in the storage 534 becomes only one at the timing when the replaceable component 53 is detached, the consumption of the storage 534 can be minimized. Moreover, since the value of the accurate consumption degree can be reflected in the storage 534, even if the detached replaceable component 53 is attached again to another image forming device as a used component, the accurate consumption degree can be made recognizable.

The description in the aforementioned embodiment illustrates a preferred example of the image forming device according to the present invention and is not limited.

For example, the real-time clock 60 is configured to be provided in the image forming device 1 main body according to the aforementioned embodiment but may be configured to be provided in the replaceable component 53. And the controller 531 may be configured to obtain the current time and date of the real-time clock 60 when electromagnetic waves of the component ID and the consumption degree stored in the storage 534 are transmitted from the replaceable component 53 at Step S5 in FIG. 6 and to transmit the obtained current time and date together as information of the time and date of attachment, and the controller 521 rewrites the information in the temporary storage 524 with the component ID, the consumption degree, and the time and date of attachment received from the replaceable component 53 by the transmitter/receiver 522.

Moreover, the case where a device including a replaceable component of the present invention is an image forming device is described as an example in the aforementioned embodiment, for example, but the device including a replaceable component is not limited to that but may be other devices such as an air-conditioning facility device including an air conditioner and a freezer/refrigerating device including a refrigerator, for example.

Moreover, examples using a ROM, a non-volatile memory, a hard disk and the like are disclosed as computer-readable mediums of the program according to the present invention in the aforementioned description, but the examples are not limited. Portable recording mediums such as a CD-ROM can be also applied as the other computer-readable mediums. Moreover, a carrier wave is also applied as a medium for providing data of the program according to the present invention through a communication line.

Other details of the configuration and detailed operations of the image forming device can be also changed as appropriate within a scope not departing from the gist of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2018-108919 submitted to the Japan Patent Office on Jun. 6, 2018 is incorporated herein by reference in its entirety.

What is claimed is:

1. A device including a consumable component, wherein the consumable component is:
a component not electrically connected to the device; and includes:
a component-side storage which stores specific identification information of the consumable component and a consumption degree of the consumable component;
a component-side transmitter/receiver which conducts transmission and reception of electromagnetic waves with the device;
a component-side hardware processor which controls rewriting of the information in the component-side storage; and
a component-side power generator which generates power for driving the component-side hardware processor, the component-side transmitter/receiver and the component-side storage on the basis of energy generated when the consumable component is attached to/detached from a joint of the device;
the device includes:
a main-body side storage which stores specific identification information of the consumable component and the consumption degree of the consumable component;
a counter which counts up the consumption degree of the consumable component stored in the main-body storage in accordance with use of the consumable component;
a main-body side transmitter/receiver which conducts transmission and reception of the electromagnetic waves with the consumable component;
a main-body side hardware processor which controls the transmission/reception of the information with the consumable component;
a main-body side power generator which generates power for driving the main-body side hardware processor, the main-body side transmitter/receiver, and the main-body side storage on the basis of energy generated when the consumable component is attached to/detached from the joint; and
a detector which detects attachment and detachment of the consumable component to/from the joint; and
the main-body side hardware processor causes the main-body side transmitter/receiver to transmit the specific identification information of the consumable component and the consumption degree of the consumable component stored in the main-body side storage when detachment of the consumable component from the joint is detected; and
the component-side hardware processor rewrites the information in the component-side storage on the basis of the specific identification information of the component and the information of the consumption degree of the consumable component transmitted by the main-body side transmitter/receiver received by the component-side transmitter/receiver.

2. The device according to claim 1, wherein
the component-side power generator and the main-body side power generator are vibration power-generation elements which generate power on the basis of vibration generated when the consumable component is attached to/detached from the joint of the device.

3. The device according to claim 1, wherein
one of the component-side power generator and the main-body side power generator is a vibration power-generation element which generates power on the basis of vibration generated when the consumable component is attached to/detached from the joint of the device, and the other is a power generation element which generates power on the basis of electromagnetic waves transmitted by using power generated by the vibration power-generation element.

4. The device according to claim 1, wherein
the detector is provided on the joint and is configured by a switch switched by attachment and detachment of the consumable component.

5. The device according to claim 1, wherein
the component-side transmitter/receiver transmits specific identification information of the consumable component and a consumption degree of the consumable component stored in the component-side storage when the consumable component is attached to the joint, and the main-body side hardware processor rewrites information in the main-body side storage with the specific identification information of the consumable component and the consumption degree of the consumable component received from the consumable component by the main-body side transmitter/receiver.

6. The device according to claim 5, wherein
the component-side hardware processor includes a power generation element which generates power on the basis of received electromagnetic waves; and
the main-body side power generator estimates a power amount required for rewriting of the specific identification information of the consumable component and the consumption degree of the consumable component in the main-body side storage, calculates an excess power amount from a difference between a power amount generated by the main-body side power generator and the power amount required for the rewriting, and causes the main-body side transmitter/receiver to transmit the electromagnetic waves corresponding to the calculated excess power amount to the consumable component.

7. The device according to claim 6, wherein
the component-side power generator causes the main-body side transmitter/receiver to transmit the electromagnetic waves corresponding to the excess power amount to the consumable component before the component-side transmitter/receiver transmits the specific identification information of the consumable component and the consumption degree of the consumable component.

8. The device according to claim 6, wherein
the main-body side hardware processor determines whether the specific identification information of the consumable component and the information on the consumption degree of the consumable component received from the consumable component is defective or not, and if it determines that the information is defective, it causes the main-body side transmitter/receiver to transmit the electromagnetic waves corresponding to the excess power amount to the consumable component.

9. The device according to claim 5, further comprising:
a hardware processor which determines whether the consumption degree of the consumable component attached by replacement exceeds a limit value determined in advance or not when the device is turned on and controls so that the component is not operated in an initial operation at the power-on if it exceeds the limit value.

10. The device according to claim 1, wherein
if the consumable component is attached to/detached from the joint when power of the device is on, the main-body side transmitter/receiver and the main-body side hardware processor are driven by power generated by the main-body side power generator or power supplied from the power supply.

11. The device according to claim 5, wherein
the device or the consumable component includes a time obtainer which obtains time-and-date information when the consumable component is attached to the joint; and
the main-body side hardware processor causes the main-body side storage to store the time-and-date information obtained by the time obtainer when the information in the main-body side storage is rewritten with the specific identification information of the consumable component and the consumption degree of the consumable component received from the consumable component by the main-body side transmitter/receiver when the consumable component is attached to the joint.

12. The device according to claim 11, further comprising:
a display which displays time-and-date information when the consumable component stored in the main-body side storage is attached to the joint.

13. The device according to claim 1, further comprising:
a display which displays a consumption degree of the consumable component.

14. The device according to claim 13, wherein
the display changes contents to be displayed depending on the consumption degree of the consumable component.

15. The device according to claim 1, wherein
the device is an image forming device.

* * * * *